M. & L. S. LACHMAN.

METALLIC STRUCTURE.

APPLICATION FILED SEPT. 15, 1910.

Reissued Apr. 7, 1914. 13,712.

WITNESSES

C. Curtis

J. P. Richards

INVENTORS.

M. Lachman and L. S. Lachman

BY

Wm. A. Megrath

ATTORNEY

UNITED STATES PATENT OFFICE.

MAURICE LACHMAN AND LAURENCE S. LACHMAN, OF NEW YORK, N. Y.

METALLIC STRUCTURE.

13,712. Specification of Reissued Letters Patent. Reissued Apr. 7, 1914.

Original No. 966,756, dated August 9, 1910, Serial No. 482,817. Application for reissue filed September 15, 1910. Serial No. 582,253.

*To all whom it may concern:*

Be it known that we, MAURICE LACHMAN and LAURENCE S. LACHMAN, residents of New York, in the county of New York and State of New York, have invented a new and useful Improvement in Metallic Structures; and we do hereby declare the following to be a full, clear, and exact description thereof.

Our invention relates to a metallic frame work or structure of a skeleton or open work character adapted for use as fencing, gates, grilles, and other devices to which it may be found applicable.

The object of our invention is to provide a construction of this character which is very rigid and durable and in which the parts composing the same cannot work loose, but are firmly united together to form an integral structure.

To these ends our invention comprises the novel features hereinafter set forth.

Figure 1:
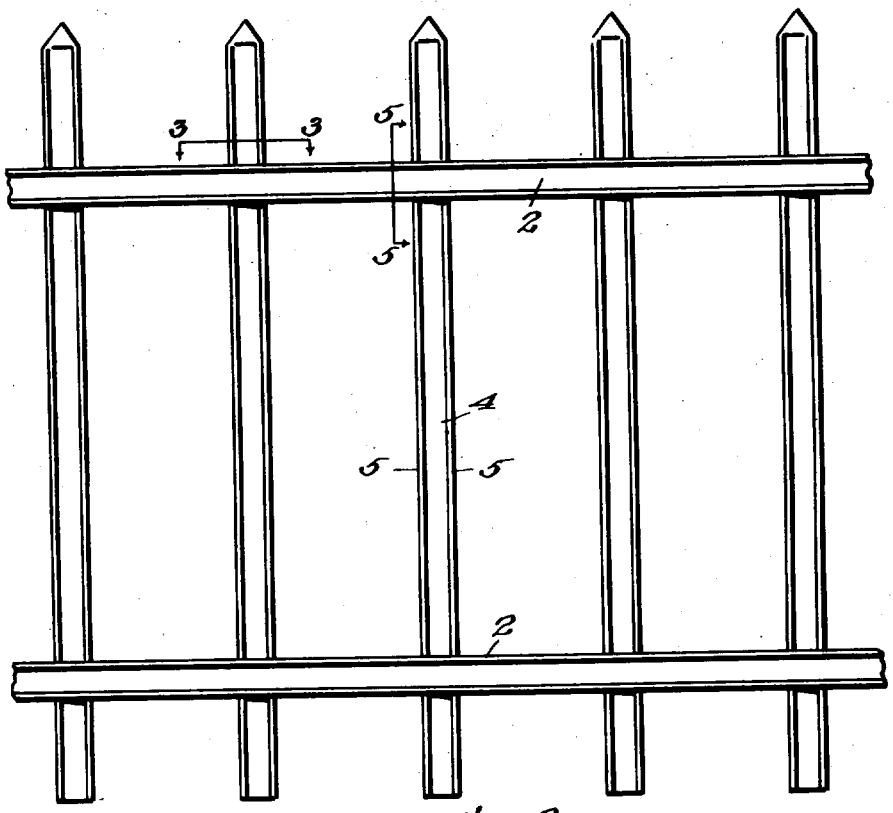
Figure 2:
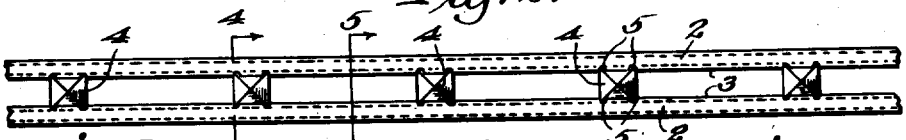
Figure 3:
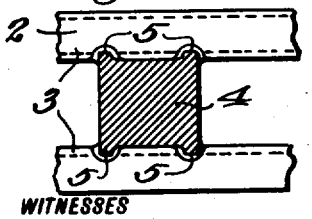
Figure 4:
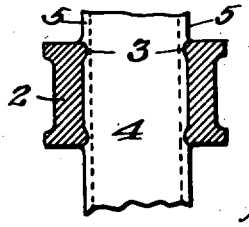
Figure 5:
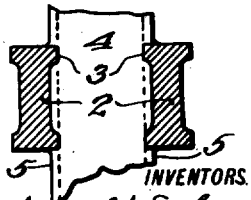

In the accompanying drawing Figure 1 is an elevation of a portion of our improved structure, the same being illustrated in the form of a fence; Fig. 2 is a plan view; Fig. 3 is an enlarged sectional view on line 3 of Fig. 1; Fig. 4 is an enlarged sectional view on line 4 of Fig. 2; and Fig. 5 is an enlarged sectional view on line 5 of Figs. 1 and 2, all the sections looking in the direction of the arrows.

In the drawing, the part marked 2 designates longitudinal strips or members of metal, which may be of any suitable dimensions, said strips having longitudinal ribs 3 or projections or welding elements thereon which may be formed by rolling or otherwise. The cross-pieces or members 4 are provided with ribs 5 or projections or welding elements, and said cross-pieces are held between the strips 2 as indicated in Figs. 2 and 3. The strips 2 and cross-pieces 4 are welded together so as to form an integral structure, and this welding may be conveniently effected by electricity. Any suitable electric welding machine may be employed for this purpose, and the ridges 3 and 5 on the strips and cross-pieces form proper protuberances or projections for creating the necessary resistance when the current is applied, so that the ridges or projections or their welding elements will become heated to the welding point, and when a slight pressure is applied the strips and cross-pieces will be joined or integrally united by the said ridges, projections or welding elements by what is commonly known as an autogenous weld. For fence purposes such a structure provides a very rigid and durable fence, as the pickets are not riveted or secured in such a manner that they may work loose and destroy the usefulness as well as the appearance of the fence, but the parts being welded together there is absolutely no possibility of any separation between the rails and the pickets and the life of the fence is extended indefinitely.

It is apparent that the structure may be formed in many different designs, whether for fencing or other purposes, and we do not in any way wish to limit ourselves to the specific construction illustrated and described. It is impossible for us to enumerate the uses to which a structure may be applied, but we desire to include within the scope of our invention any uses for the invention which may develop in the future.

What we claim is:

1. A metallic frame work or structure comprising longitudinally extending strips having ribs or ridges at their edges and cross-pieces uniting said strips having vertical ribs or ridges at their edges, said cross-pieces being held between pairs of said strips the ribs on said strips being electrically welded to the ribs on said cross-pieces.

2. A metallic frame work or structure comprising longitudinally extending strips, each having longitudinal ribs on a side thereof, cross-pieces between said strips, each cross-piece having a rib on each side adjacent to a longitudinal strip, the ribs on the strips being welded to the ribs on the cross-pieces.

3. A metallic frame work or structure comprising longitudinally extending members, each member having a projection on a side thereof, cross members between said longitudinal members having projections on each side adjacent to the longitudinal members, the said members being electrically welded together by said projections.

4. A metallic frame work or structure consisting of longitudinally extending members, cross members between said longitudinal members and welding elements between the adjacent faces of said members, the said members being welded by the welding elements.

In testimony whereof, we the said MAURICE LACHMAN and LAURENCE S. LACHMAN have hereunto set our hands.

MAURICE LACHMAN.
LAURENCE S. LACHMAN.

Witnesses:
REGINALD HAWLEY,
WM. A. MEGRATH.